United States Patent Office 3,335,133
Patented Aug. 8, 1967

3,335,133
AMINOCYCLOALKYL DERIVATIVES OF 5H-DIBENZ[b,f]AZEPINE
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed Nov. 16, 1964, Ser. No. 411,576
12 Claims. (Cl. 260—239)

The present invention relates to 5H-dibenz[b,f]azepine compounds, in particular to 5H-dibenz[b,f]azepine compounds having attached in the 5-position thereof an amino- or aminomethyl-cycloalkyl or -cycloalkylmethyl group.

The compounds of the invention are useful as anorexics, antidepressants, antihistaminics, and transquilizers. They are most useful for their ability to inhibit appetite and to relieve depression.

The compounds of the invention possess the following chemical structure:

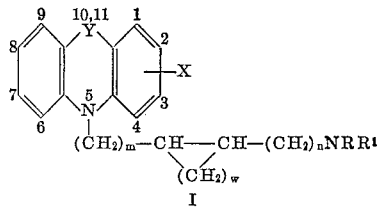

I wherein:
Y is —CH$_2$CH$_2$— or —CH=CH—;
X is hydrogen, chloro, or trifluoromethyl, and may be in the 1,2,3 or 4-position;
m and n are 0 or 1; w is 1 or 2; and
R and R$^1$ are hydrogen, lower alkyl of up to three carbon atoms, or taken together with the nitrogen atom to which they are attached are piperidino, pyrrolidino, morpholino, 4-methylpiperazin-1-yl, or 4-(2-hydroxyethyl)piperazin-1-yl.

A preferred group of compounds of the present invention is represented by the following structural formula:

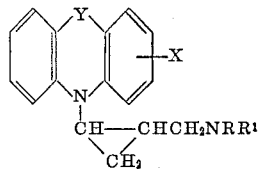

wherein:
Y is —CH$_2$CH$_2$— or —CH=CH—;
X is hydrogen, chloro, or trifluoromethyl; and
R and R$^1$ are hydrogen, lower alkyl of up to three carbon atoms, or taken together with the nitrogen atom to which they are attached are piperidino, pyrrolidino, morpholino, 4-methylpiperazin-1-yl, or 4-(2-hydroxyethyl)piperazin-1-yl.

The preferred compounds of the invention are trans-2 - (5H - dibenz[b,f]azepin - 5 -yl) - 1 - (dimethylaminomethyl)cyclopropane (II) and its 10,11-dihydro analog.

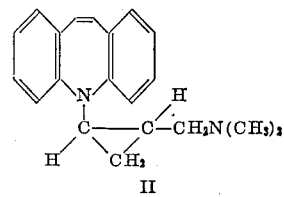

II

These compounds have been found to possess antidepressant activity, the former being approximately equal to that of imipramine, a commercially important antidepressant, when tested in rats for its ability to antagonize reserpine-induced ptosis. This compound also possesses anorexic activity approximately one-fifth that of the widely-used dextroamphetamine.

It will be apparent by inspection that there can arise in compounds of Formula I both optical and geometric (cis-trans) isomerism. It is to be understood that the present invention comprehends the resolved optical isomers and racemic mixtures thereof, and cis and trans geometric isomers and mixtures thereof.

The compounds of the invention are prepared by a variety of synthetic routes, which are partly illustrated in Chart A. A dibenzazepine (III), optionally substituted at the 1,2,3, or 4-position with a chloro or trifluoromethyl group, is condensed with a bromo or bromomethyl-cyclopropane or cyclobutanecarboxamide to form a compound of Formula IV. Compounds of Formula I in which $m=0$ require the use of a bromocycloalkanecarboxamide; compounds in which $m=1$ require the use of a bromomethyl-cycloalkanecarboxamide for their synthesis. It is obvious that $w=1$ for cyclopropyl compounds and $w=2$ for cyclobutyl compounds. The carboxamide nitrogen atom may be substituted with one or two lower alkyl groups or may form part of a five or six-membered ring as defined above for R and R$^1$.

Chart A

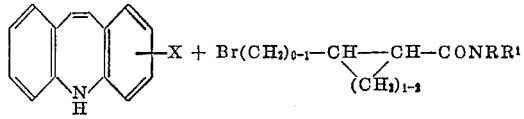

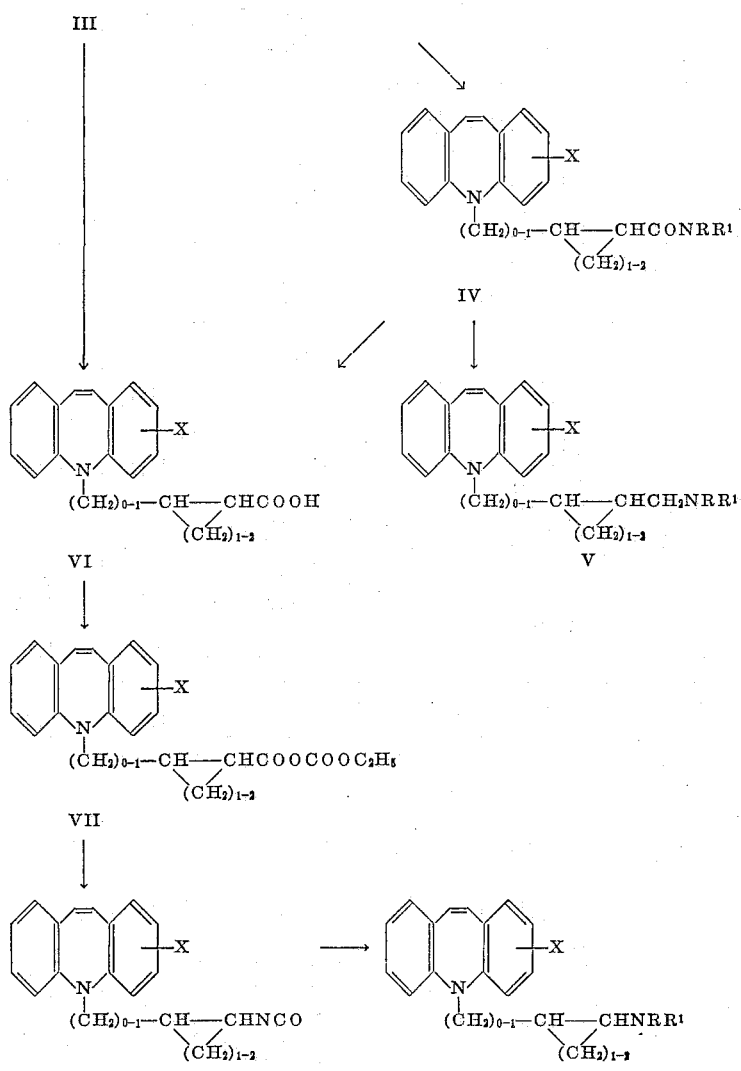

To convert IV into a product of Formula I in which $n=1$, the amide is reduced with a reagent such as lithium aluminum hydride to form the amine V. Catalytic reduction of the 10,11-double bond results in the formation of a corresponding 10,11-dihydrodibenzazepine.

Conversion of the intermediate IV into a product in which $n=0$ requires a different sequence of reactions. The amide is first hydrolyzed to an acid (VI) by treatment with a mineral acid such as sulfuric or hydrochloric acid. Alternatively, the acid may be prepared by initially treating the dibenzazepine III with a bromo ester, rather than an amide, followed by acidic hydrolysis of the ester. The acid VI is then converted to an isocyanate (VIII) by reaction with a lower alkyl haloformate to give a mixed anhydride (VII), treatment with sodium azide to form an acid azide, and then heating the azide in an inert organic solvent to give the isocyanate VIII. The isocyanate can be hydrolyzed with a mineral acid or alkali at elevated temperature to a primary amine (IX) in which R and $R^1$ are hydrogen; it can be treated with a lower alkanol or a lower alkyl Grignard reagent to give a carbalkoxyaminocycloalkane or a lower acylamino cycloalkane, respectively, which are either reduced with, for example, lithium aluminum hydride, to form a product (IX) in which R is hydrogen and $R^1$ is lower alkyl, or may be first alkylated with a lower alkyl iodide or sulfate to form a carbalkoxy-alkylamino or an acylalkylaminocycloalkane, which is then reduced with lithium aluminum hydride to form a product (IX) in which R and $R^1$ are both lower alkyl.

The mixed anhydride VII produced by treatment of the acid VI with a lower alkyl chloroformate can also be directly treated with a secondary amine to form an amide of structure IV, which is then reduced by means of a reagent such as lithium aluminum hydride to form an amine (V). It is obvious that in the products IV and V, R and $R^1$ are dependent on the secondary amine employed.

When the first step of the synthetic sequence consists of the condensation of a dibenzazepine with a bromomethylcycloalkanecarboxamide, the stereochemistry of the final product will be the same as that of the starting bromomethylcycloalkanecarboxamide. Thus, cis and trans products are prepared by starting with the appropriate cycloalkane. However, when the bromocycloalkanecarboxamide is employed, the more stable trans product is produced.

A procedure for the preparation of cis as well as trans cyclopropyl dihydrodibenzazepine compounds in which $m=0$ and $w=1$ involves the reaction of a 5-vinyl-10,11-dihydrodibenzazepine (X) with ethyl diazoacetate to form a mixture of cis- and trans-dibenzazepinylcyclopropanecarboxylates (XI) and is shown in Chart B. The mixture of isomeric esters is then selectively hydrolyzed with alkali to give the trans-acid and unhydrolyzed cis-ester. Hydrolysis of the cis-ester with excess alkali affords the cis-acid. Both isomeric acids are thus available for further reaction. The acid is then converted to a mixed anhydride (XIII) as described above, from which any of the desired amino compounds wherein $n=0$ or 1 (XV) can be prepared, as described above, by reaction with a secondary amine or conversion to an isocyanate.

Chart B

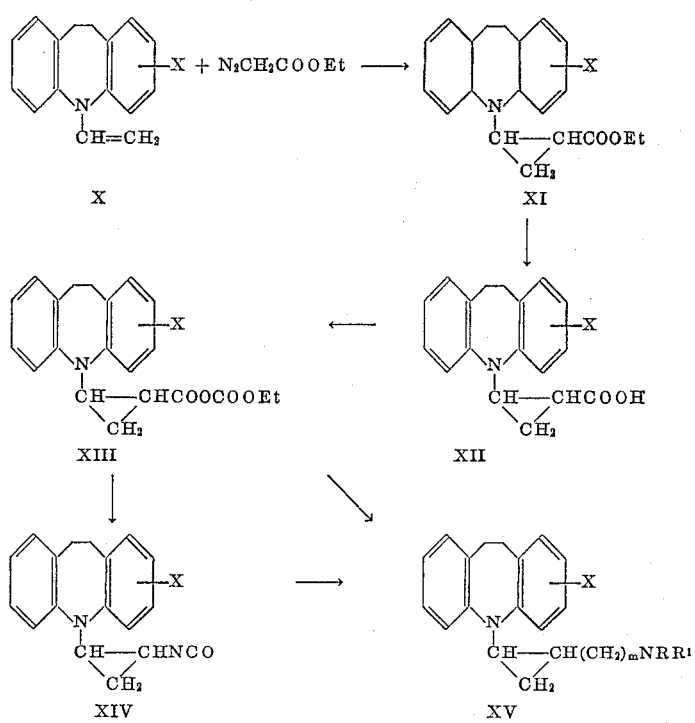

Another useful method for the preparation of compounds of Formula I in which m=1, involves the direct N-alkylation of a 5-unsubstituted dibenzazepine with an active ester derivative of an amino or aminomethyl-cycloalkylcarbinol (XVI). Particularly useful is the p-toluenesulfonate ester.

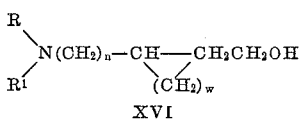

These carbinols are prepared by reaction of a bromo or bromomethyl-cycloalkanecarboxlate ester with a primary or secondary amine or amine precursor, followed by reduction of the ester function with a reagent such as lithium aluminum hydride. Carbinols wherein $n$ and $w$ both are 1, may also be prepared by reacting a γ-bromocrotonate with a secondary amine to form an aminocrotonate. This crotonate is then reacted with a reagent formed from trimethyl sulfoxonium iodide. The latter reagent in the presence of a strong base such as sodium hydride forms the reactive compound dimethylsulfoxonium methylide.

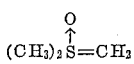

which adds a methylene group across the crotonate double bond. Reduction of this product with, for example, lithium aluminum hydride yields the carbinol. A further method of preparation of an aminocarbinol is by amination of a half ester-half acid chloride of a cycloalkanedicarboxylic acid.

Certain compounds within the scope of Formula I in which R and R¹, together with the nitrogen atom to which they are attached, form a heterocyclic group, may be prepared from the corresponding compound in which R and R¹ are both hydrogen. The primary amine can thus be condensed with a dihalo compound such as 1,4-dibromobutane or 1,5-dibromopentane, to produce the pyrrolidino and piperidino derivatives, respectively. Similarly, reaction of the primary amine with bis(β-chloroethyl)methylamine gives the N-methylpiperazinyl analog.

When a 10,11-dihydrodibenzazepine product has been prepared, it may be converted to the corresponding dibenzazepine having a double bond at the 10–11 positions by methods known to the dibenzazepine art, for example, catalytic dehydrogenation.

The starting materials for the preparation of the compounds of this invention are either known compounds or readily prepared by conventional methods from known compounds. The 1,2,3, or 4-substituted or unsubstituted 5H-dibenz[b,f]-azepines and the 10,11-dihydro derivatives are known compounds. The 5-vinyl derivative is readily prepared by alkylation of a 5-unsubstituted compound with 2-dimethylaminoethyl chloride or bromide, quaternization with methyl iodide, and Hofmann degradation. The bromo and bromomethyl-cycloalkanecarboxamides are readily prepared from the corresponding esters by hydrolysis, conversion to the acid chloride, and amidation with a secondary amine.

It will be apparent to one skilled in the art of organic chemistry that instead of using as starting materials 5H dibenz[b,f]azepines with a chloro or trifluoromethyl group in the 1,2,3, or 4-position thereof, there can alternatively be a methyl, methoxy, or methylthio group. It is obvious that products prepared from these varied starting materials will bear these substituents in the corresponding positions, and these products are to be considered the full equivalents of the compounds specifically claimed.

The nontoxic pharmaceutically acceptable acid addition salts of the compounds of Formula I are also included within the scope of this invention. Both organic and inorganic acids can be employed to form such salts, illustrative acids being sulfuric, nitric, phosphoric, hydrochloric, citric, acetic, lactic, tartaric, pamoic, ethanedisulfonic, sulfamic, succinic, cyclohexylsulfamic, fumaric, maleic, benzoic and the like. These salts are readily prepared by methods known to the art.

The foregoing is a general description of the primary synthetic routes used in the preparation of the aminocycloalkyldibenzazepines of the present invention. It will be apparent to one skilled in the art of organic chemistry that variations of these procedures are possible. The following examples should be considered illustrative of the methods of preparing the compounds of the invention, but should not be considered limitative of the scope of the invention.

EXAMPLE 1

*Trans-2-(5H-dibenz[b,f]azepin-5-yl)-1-(dimethylaminomethyl)-cyclopropane*

To a stirred solution of 130 g. (.676 mole) of ethyl 2-bromocyclopropanecarboxylate in 350 ml. of 95% ethanol, there is added slowly at 0–10° a solution of 56 g. (1 mole) of potassium hydroxide in 75 ml. of water. The solution is stirred at room temperature for one hour, and stirred and refluxed for an additional hour. The solution is then evaporated in vacuo, the residue dissolved in a small volume of water, and hydrochloric acid added to pH 1. The mixture is extracted with ether, the ether extracts dried with magnesium sulfate, and the solution then evaporated to give 97 g. of the oily acid. Thionyl chloride (100 ml.) is added and the solution is allowed to stand overnight at room temperature. The solution is then heated on the steam bath for fifteen minutes and then distilled at 90–115°/65 mm. to yield 87.3 g. of acid chloride. The acid chloride is then dissolved in 200 ml. of ether and added dropwise at 0° to a stirred solution of 67.5 g. (1.5 moles) of dimethylamine in 400 ml. of ether. The mixture is then stirred at room temperature for three hours and 50 ml. of 40% dimethylamine in water is added. The layers are separated. The aqueous-layer is saturated with sodium chloride and then extracted with ether. The combined ether extracts are dried and evaporated in vacuo to yield an oil which is distilled at 132–142°/28 mm. to give 82.4 g. of 2-bromo-N,N-dimethyl-cyclopropanecarboxamide.

To a stirred solution of 4.6 g. (.024 mole) of 5H-dibenz[b,f]azepine in 30 ml. of dimethylsulfoxide there is added 1.0 g. (.024 mole) of a 58.5% dispersion of sodium hydride in mineral oil. The mixture is heated to 50–60° for twenty minutes, or until the evolution of hydrogen has ceased. The solution is cooled to 20° and a solution of 4.6 g. (.024 moles) of 2-bromo-N,N-dimethylcyclopropanecarboxamide in 10 ml. of dimethylsulfoxide is added dropwise. The mixture is stirred at steam bath temperature for thirty minutes, then poured into 500 ml. of ice water, and extracted with 3–100 ml. portions of ether. The ether extracts are dried and evaporated to give as a yellow-orange viscous oil, 5.5 g. of trans-2-(5H-dibenz[b,f]azepin - 5-yl)-N,N-dimethylcyclopropanecarboxamide.

To a stirred suspension of 3.5 g. (.10 mole) of lithium aluminum hydride in 200 ml. of dry ether is added dropwise a solution of 5.5 g. (.018 mole) of trans-2-(5H-dibenz[b,f]azepin - 5-yl)-N,N-dimethylcyclopropanecarboxamide in 100 ml. of ether. The mixture is stirred and refluxed for five hours, then decomposed by the addition of 4 ml. of water, 4 ml. of 10% sodium hydroxide, and 12 ml. more water. The mixture is filtered and the filtrate extracted with 10% acetic acid. The acid extracts are made alkaline with 40% sodium hydroxide, and the mixture extracted with ether. The ether extracts are dried and evaporated to give the title product as yellow crystals.

The maleate salt is prepared by dissolving the free base in 100 ml. of ethanol, adding 4.0 g. of maleic acid, and warming on the steam bath. Upon cooling and addition of ether, 4.0 g. of pale yellow crystals, M.P. 200–201°, are obtained.

EXAMPLE 2

*Trans-2-(10,11-dihydro-5H-dibenz[b,f]azepin-5-yl)-1-(dimethylaminomethyl)cyclopropane*

To a solution of 5.8 g. of trans-2-(5H-dibenz[b,f]-azepin - 5-yl)-1-(dimethylaminomethyl)cyclopropane in 150 ml. of glacial acetic acid (pretreated with Raney nickel) there is added dry hydrogen chloride until the solution is just acidic; then 0.6 g. of platinum oxide is added, and the mixture hydrogenated at fifty p.s.i. Hydrogenation is continued for twelve hours, or until one equivalent of hydrogen is absorbed, the mixture is filtered, and the filtrate evaporated in vacuo. The residue is dissolved in 200 ml. of water, the solution made alkaline with 40% sodium hydroxide, and the basic solution extracted with ether. The ether extracts are dried and evaporated to give a reddish-yellow oil. The oil is chromatographed through alumina, eluted with petroleum ether until the eluate no longer contains basic material, and the combined eluates evaporated to yield 4.9 g. of the title product as a pale yellow oil.

A maleate salt is prepared by dissolving the free base in a solution of 2.5 g. of maleic acid in ethanol and then ether is added to precipitate the salt. Colorless crystals (3.2 g.) are obtained, which are recrystallized from ethyl acetate, M.P. 149–151°.

EXAMPLE 3

*Cis-2-(3-chloro-10,11-dihydro-5H-dibenz[b,f]azepin-5-yl)-cyclopropyldiethylamine*

To a stirred mixture of 134 g. of 3-chloro-10,11-dihydro-5H-dibenz[b,f]azepine in 500 ml. of dry toluene is added, under nitrogen, 21.5 g. of sodium amide. The mixture is stirred and refluxed for two hours, the heat is removed and a solution of 2-dimethylaminoethyl chloride in toluene is added dropwise. The latter is prepared by dissolving 144 g. of 2-dimethylaminoethyl chloride hydrochloride in a minimum volume of water, adding with cooling excess 40% sodium hydroxide solution, saturating the mixture with sodium carbonate and extracting with toluene.

The reaction mixture is stirred and refluxed for two hours, cooled and then treated with 25 ml. of ethanol followed by 250 ml. of water, the latter added slowly. The separated organic layer is dried and concentrated in vacuo. The residue is distilled to give 3-chloro-5-(2-dimethylaminoethyl)-10,11-dihydro-5H-dibenz[b,f]azepine.

To a stirred solution of 125 g. of this dibenzazepine in 1.2 l. of acetone is added dropwise a solution of 71 g. of methyl iodide in 200 ml. of acetone. The reaction mixture is stirred at room temperature for one hour and then filtered to give 3-chloro-5-(2-dimethylaminoethyl)-10,11-dihydro-5H-dibenz[b,f]azepine methiodide.

A suspension of anion exchange resin (hydroxide form) is washed several times with methanol, then suspended in 800 ml. of methanol and 74 g. of the above dibenzazepine methiodide suspended in 150 ml. of methanol is added. The mixture is stirred at room temperature for one hour and filtered, and the resin cake is washed with methanol. The filtrates are concentrated in vacuo and the residue (the corresponding dibenzazepine methyl methoxide) is heated on a steam bath in vacuo until gas evolution is complete. The residue is taken up into ether and the solvent removed in vacuo to give 3-chloro-5-vinyl-10,11-dihydro-5H-dibenz[b,f]-azepine.

To a refluxing mixture of 2 g. of anhydrous cupric sulfate powder and 100 ml. of dry benzene is added, dropwise with stirring, a solution of 46.0 g. of the above 3-chloro-5-vinyl-10,11-dihydro-5H-dibenz[b,f]azepine and 27.4 g. of ethyl diazoacetate in 150 ml. of dry benzene. After addition is complete, the mixture is refluxed for 30 minutes, filtered and the filtrate concentrated in vacuo to give the residual ethyl 2-(3-chloro-10,11-dihydro-5H-dibenz[b,f]azepin-5-yl)-cyclopropanecarboxylate.

To a stirred solution of the above carboxylate (34.2 g., .10 mole) in 200 ml. of ethanol is added a solution of 3.4 g. (0.006 M, equivalent to trans-isomer as indicated by vapor phase chromatography) of potassium hydroxide in 10 ml. of water. The mixture is refluxed for two hours and then concentrated in vacuo. The residue is diluted with water and extracted with ether. The ether extracts are dried over magnesium sulfate and concentrated to give ethyl cis-2-(3-chloro-10,11-dihydro-5H-dibenz[b,f]azepin-5-yl)cyclopropanecarboxylate. The aqueous layer is acidified with acetic acid (pH 6) and extracted with ether. The ether extract is dried and concentrated in vacuo to give trans-2-(3-chloro-10,11-dihydro-5H-dibenz[b,f]azepin-5-yl)cyclopropanecarboxylic acid. Similar hydrolysis of the cis-ester with an excess of aqueous-ethanolic potassium hydroxide gives cis-2-(3-chloro-10,11-dihydro-5H-dibenz[b,f]azepin-5-yl)-cyclopropanecarboxylic acid.

To a solution of 6.22 g. of the above cis acid in 60 ml. of acetone, cooled to 0° C. is added 4.7 ml. of triethylamine in acetone and 3.2 ml. of ethyl chloroformate. The mixture is stirred for 15 minutes and then a solution of 2.6 g. of sodium azide in water is added. After stirring for 30 minutes, the reaction mixture is poured into ice water and extracted with toluene. The dried extract is heated on the steam bath to decompose the acid azide. Removal of the solvent gives the residual cis-2-(3-chloro-10,11-dihydro-5H-dibenz[b,f]azepin-5-yl)cyclopropyl isocyanate.

To a stirred mixture of 50 ml. of 3 M methyl magnesium bromide in ether is added 7.1 g. of the above isocyanate in ether. The mixture is refluxed for two hours, cooled and 200 ml. of 10% hydrochloric acid solution is added slowly. The separated aqueous layer is extracted with ether. Concentration of the organic solutions gives the cis-2-(3-chloro-10,11-dihydro - 5H-dibenz[b,f]azepin-5-yl)-1-acetamidocyclopropane.

To a solution of 7.3 g. of the above acetamidocyclopropane in 70 ml. of tetrahydrofuran is added 1.0 g. of 53.5% sodium hydride and the mixture is stirred and refluxed for one hour. A solution of 8 ml. of ethyl iodide in 25 ml. of tetrahydrofuran is added to the cooled reaction mixture which is then refluxed for four hours. An additional 8 ml. of ethyl iodide in 10 ml. of tetrahydrofuran is added and refluxing continued for 12 hours. The reaction mixture is filtered and the filtrate concentrated in vacuo. The residue is taken up in water and ether, extracted with ether and the dried solvent removed to give cis-2-(3-chloro - 10,11 - dihydro-5H-dibenz[b,f]azepin-5-yl)-1-(N-ethylacetamido)cyclopropane.

A solution of the above N-ethylacetamidocyclopropane (7.8 g.) in ether is added to a suspension of 5.0 g. of lithium aluminum hydride in ether and the mixture stirred and refluxed for six hours. Decomposition of the metal complex yields an oil which is treated in acetone solution with ethereal hydrogen chloride to give cis-2-(3-chloro-10,11-dihydro - 5H - dibenz[b,f]azepin-5-yl)-cyclopropyldiethylamine hydrochloride.

Direct hydrolysis of the above isocyanate in concentrated hydrochloric acid at reflux for one hour yields upon workup cis-2-(3-chloro-10,11-dihydro-5H-dibenz[b,f]azepin-5-yl)cyclopropylamine.

EXAMPLE 4

*Cis - 2 - (3 - trifluoromethyl - 10,11 - dihydro - 5H - dibenz[b,f]azepin - 5 - yl) - 1 - [4 - (2 - hydroxyethyl)-piperazin - 1 - ylmethyl]cyclopropane*

To a mixture of 3.9 g. of cis-2-(3-trifluoromethyl-10,11-dihydro - 5H - dibenz[b,f]azepin - 5 - yl)cyclopropanecarboxylic acid (prepared as in Example 3 from 2-(3-trifluoromethyl) - 10,11 - dihydro - 5H - dibenz[b,f]azepine) and 3 ml. of triethylamine, cooled to 0° C., is added 2 ml. of ethyl chloroformate in acetone. The mixture is stirred for 15 minutes and then 4.4 g. of 1-(2-hydroxyethyl)piperazine in acetone is added with cooling. After stirring for three hours at room temperature, the reaction mixture is poured into cold water and extracted with ether. The dried extract is evaporated to give cis-1-(2-hydroxyethyl) - 4 - [2 - (3 - trifluoromethyl - 10,11 - dihydro - 5H - dibenz[b,f]azepin - 5 - yl)cyclopropylcarbonyl]piperazine.

To a suspension of 1.0 g. of lithium aluminum hydride in ether is added a suspension of 4.0 g. of the above piperazine compound in ether and the mixture stirred and refluxed for eight hours. After standing overnight at room temperature, the reaction mixture is decomposed and filtered, and the filtrate acidified with ethanol-ethereal hydrogen chloride. Addition of excess ether precipitates the solid hydrochloride of the title product.

EXAMPLE 5

*Trans-2-(5H-dibenz[b,f]azepin-5-ylmethyl)-1-piperidinomethylcyclobutane*

To a stirred solution of 4.6 g. of 5H-dibenz[b,f]azepine in 30 ml. of dimethylsulfoxide there is added 1.0 g. of a 58.5% dispersion of sodium hydride in mineral oil. The mixture is heated to 50–60° for twenty minutes, or until evolution of hydrogen has ceased. The solution is cooled to 20° and a solution of 5.9 g. of trans-1-(2-bromomethylcyclobutylcarbonyl)piperidine (prepared as in Example 1 from ethyl 2-bromomethylcyclobutanecarboxylate and piperidine) in 10 ml. of dimethylsulfoxide is added dropwise. The mixture is stirred at steam bath temperature for thirty minutes, then poured into 500 ml. of ice water, and extracted with 3–100 ml. portions of ether. The ether extracts are dried and evaporated to give as an oil trans - 1 - [2-(5H-dibenz[b,f]azepin-5-ylmethyl)cyclobutylcarbonyl]piperidine.

To a stirred suspension of 3.5 g. of lithium aluminum hydride in 200 ml. of dry ether is added dropwise a solution of 6.4 g. of the above compound in 100 ml. of ether. The mixture is stirred and refluxed for five hours, then decomposed by the addition of 4 ml. of water, 4 ml. of 10% sodium hydroxide, and 12 ml. more water. The mixture is filtered and the filtrate extracted with 10% acetic acid. The acid extracts are made alkaline with 40% sodium hydroxide, and the mixture extracted with ether. The ether extracts are dried and evaporated to give the title product.

EXAMPLE 6

*Trans-2-(3-chloro-5H-dibenz[b,f]azepin-5-ylmethyl)-1-methylaminocyclobutane*

3-chloro-5H-dibenz[b,f]azepine (4 g.) is condensed with ethyl trans-2-bromomethylcyclobutanecarboxylate and the product is converted to trans-2-(3-chloro-5H-dibenz[b,f]azepin-5-ylmethyl)cyclobutyl isocyanate according to the procedure of Example 3. To a suspension of 2.5 g. of lithium aluminum hydride in ether is added a solution of 12.2 g. of the above isocyanate in ether and the mixture is refluxed for four hours. The reaction mixture is decomposed, filtered, and the ether removed to give the title product. The 10,11-dihydro analog is prepared by reducing a solution of this product in glacial acetic acid with hydrogen over a platinum oxide catalyst according to the procedure of Example 2.

EXAMPLE 7

*Trans-2-(5H-dibenz[b,f]azepin-5-yl)-1-(4-methylpiperazin-1-ylmethyl)cyclopropane*

To a solution of 4.6 g. of 5H-dibenz[b,f]azepine in 30 ml. of dimethylsulfoxide there is added 1.0 g. of a 58.5% dispersion of sodium hydride in mineral oil. The mixture is then heated and cooled as in Example 1 and then treated with 5.9 g. of 1-(2-bromocyclopropylcarbonyl)-4-methylpiperazine. The reaction is carried out and worked up according to the procedure of Example 1, and the amide intermediate then reduced with lithium aluminum hydride to form the title product.

EXAMPLE 8

*Trans-2-(3-trifluoromethyl-5H-dibenz[b,f]azepin-5yl)-1-morpholinomethylcyclobutane*

To a solution of 6.2 g. of 3-trifluoromethyl-5H-dibenz[b,f]azepine in 30 ml. of dimethylsulfoxide there is added 1.0 g. of a 58.5% dispersion of sodium hydride in mineral oil. The mixture is then heated and cooled as in Example 1 and then treated with 6.0 g. of 4-(2-bromocyclobutylcarbonyl)morpholine. The reaction is carried out and worked up according to the procedure of Example 1, and the amide intermediate then reduced with lithium aluminum hydride to form the title product.

EXAMPLE 9

*Trans-2-(3-trifluoromethyl-5H-dibenz[b,f]azepin-5-yl)-1-pyrrolidinomethylcyclopropane*

By substitution of 1-(2-bromocyclopropylcarbonyl)pyrrolidine for 4-(2-bromocyclobutylcarbonyl)morpholine in Example 8, the title compound is prepared.

EXAMPLE 10

*Trans-2-(5H-dibenz[b,f]azepin-5-ylmethyl)-1-dimethylaminomethyl)cyclopropane*

To a stirred solution of 46.5 g. (0.25 mole) diethyl trans-1,2-cyclopropanedicarboxylate in 100 ml. of 95% ethanol at 0° is added a solution of 15.4 g. (0.28 mole) of potassium hydroxide in 20 ml. of water. The solution is stirred at 0° for one hour, then refluxed for one hour. The solution is evaporated in vacuo, the residue dissolved in 100 ml. of water, and the mixture extracted with ether. The aqueous solution is made acidic with conc. hydrochloric acid and the mixture extracted with ether. The extracts are dried and evaporated to give the monoethyl ester of trans-1,2-cyclopropanedicarboxylic acid.

To 140 g. (0.88 mole) of this half ester is added 137 g. (1.1 moles) of thionyl chloride. The solution is allowed to stand at room temperature overnight and then heated on the steam bath for an hour. The half ester-half acid chloride is distilled at 113–120°/30 mm.

A solution of 35.3 g. (0.2 mole) of this acid chloride in 350 ml. of ether is treated with gaseous dimethylamine until distinctly alkaline. The solution is allowed to stand at 0° for thirty minutes, water (2×5 ml.) is added, and the ethereal solution is dried and evaporated to give ethyl trans-2-dimethylcarbamoylcyclopropanecarboxylate.

To a stirred suspension of 15.2 g. (0.4 mole) of lithium aluminum hydride in 500 ml. of ether is added dropwise a solution of 37.0 g. (0.2 mole) of the above ester amide in 150 ml. of ether. The mixture is then stirred and refluxed for two hours and is then allowed to stand at room temperature. The hydride and complex are decomposed by the addition of 15 ml. of water, 15 ml. of 10% sodium hydroxide, and then 45 ml. of water, and the mixture is filtered. Evaporation of the filtrate and distillation at 126–127°/38 mm. give 2-hydroxymethyl-1-(dimethylaminomethyl)cyclopropane.

To a stirred solution of 6.5 g. (0.05 mole) of the above amino alcohol in 30 ml. of tetrahydrofuran is added in portions with cooling 2.1 g (.05 mole) of a 58.5% dispersion of sodium hydride in mineral oil. The mixture is stirred and refluxed until hydrogen evolution is complete (ca. thirty minutes), then it is cooled in an ice bath, and a solution of 9.5 g. (.05 mole) of p-toluenesulfonyl chloride in 20 ml. of tetrahydrofuran is added dropwise. The mixture is stirred at room temperature for ten minutes, then it is added dropwise to a suspension obtained by the addition of 2.1 g. (.05 mole) of sodium hydride (58.5% dispersion in mineral oil) to 0.65 g. (.05 mole) of 5H-dibenz[b,f]azepine in 50 ml. of dimethylsulfoxide (stirred until hydrogen evolution is completed). The mixture is heated at 100° for an hour, then poured into 1 liter of ice water, and extracted with ether. The ether extracts are then extracted with dilute acetic acid, the acid extracts are made alkaline with 40° sodium hydroxide, and the mixture extracted with ether. The title product is obtained by drying and evaporating the ether extracts and distilling the product.

We claim:
1. A chemical compound selected from the group consisting of a free base of the structure

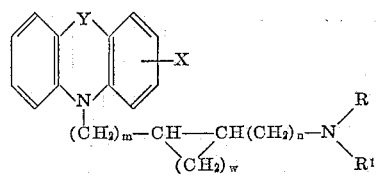

wherein:
Y is selected from the group consisting of
$$-CH_2-CH_2-$$
and $-CH=CH-$;
X is selected from the group consisting of hydrogen, chloro, and trifluoromethyl;
$m$ and $n$ are each an integer from 0 to 1;
$w$ is an integer from 1 to 2; and
R and $R^1$ are each selected from the group consisting of hydrogen, lower alkyl of up to three carbons atoms, and, when taken together with the nitrogen atom to which they are attached, piperidino, pyrrolidino, morpholino, 4-methylpiperazin-1-yl, and 4-(2-hydroxyethyl)piperazin-1-yl;
and the pharmaceutically acceptable acid addition salts thereof.

2. A chemical compound of the structure

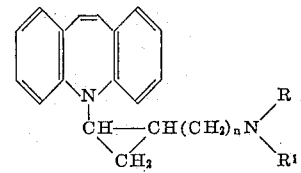

wherein R and $R^1$ are lower alkyl of up to three carbon atoms and $n$ is an integer from 0 to 1.

3. A chemical compound of the structure

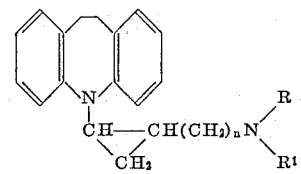

wherein:
R and $R^1$ are lower alkyl of up to three carbon atoms; and
$n$ is an integer from 0 to 1.

4. A chemical compound of the structure

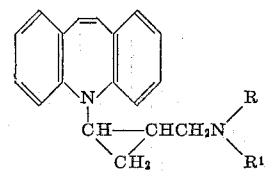

wherein R and $R^1$ are lower alkyl of up to three carbon atoms.

5. A chemical compound of the structure

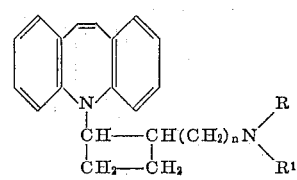

wherein:
R and $R^1$ are lower alkyl of up to three carbon atoms; and
$n$ is an integer from 0 to 1.

6. A compound of the structure

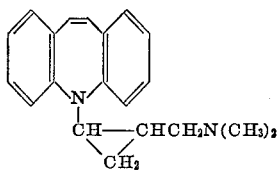

7. A compound of the structure

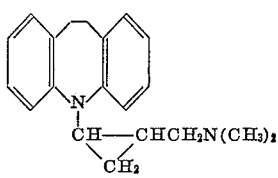

8. Trans - 2-(5H-dibenz[b,f]azepin-5-yl)-1-(dimethylaminomethyl)cyclopropane.
9. Trans - 2 - (10,11-dihydro-5H-dibenz[b,f]azepin-5-yl)-1-(dimethylaminomethyl)cyclopropane.
10. A compound of the structure

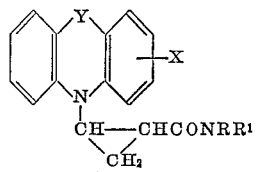

wherein:
Y is selected from the group consisting of —CH$_2$—CH$_2$— and —CH=CH—;
X is selected from the group consisting of hydrogen, chloro, and trifluoromethyl; and
R and R$^1$ are each selected from the group consisting of hydrogen, lower alkyl of up to three carbon atoms, and, when taken together with the nitrogen atom to which they are attached, piperidino, pyrrolidino, morpholino, 4-methylpiperazin-1-yl, and 4-(2-hydroxyethyl)piperazin-1-yl.
11. A compound of the structure

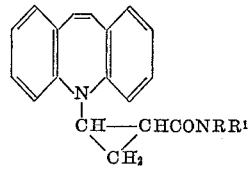

wherein R and R$_1$ are lower alkyl of up to three carbon atoms.
12. Trans - 2 - (5H - dibenz[b,f]azepin-5-yl)-N,N-dimethylcyclopropanecarboxamide.

No references cited.

ALEX MAZEL, *Primary Examiner.*
ALTON D. ROLLINS, *Examiner.*